(12) United States Patent
Dehm et al.

(10) Patent No.: US 7,150,367 B2
(45) Date of Patent: Dec. 19, 2006

(54) STORAGE AND RETRIEVAL UNIT

(75) Inventors: Thomas Dehm, Reutlingen (DE); Franz Ehrenleitner, Stuttgart (DE)

(73) Assignee: Eisenmann Maschinenbau KG (Komplementar: Eisenmann-Stiftung), Boblingen (DE)

( * ) Notice: Subject to any disclaimer, the term of this patent is extended or adjusted under 35 U.S.C. 154(b) by 230 days.

(21) Appl. No.: 10/729,858

(22) Filed: Dec. 5, 2003

(65) Prior Publication Data

US 2005/0036859 A1 Feb. 17, 2005

(30) Foreign Application Priority Data

Dec. 5, 2002 (DE) ................. 102 57 107

(51) Int. Cl.
*B66C 13/06* (2006.01)
(52) U.S. Cl. .................. 212/274; 294/81.4
(58) Field of Classification Search ........... 212/272, 212/273, 274; 294/81.4; 414/266
See application file for complete search history.

(56) References Cited

U.S. PATENT DOCUMENTS

| | | | |
|---|---|---|---|
| 3,567,040 A * | 3/1971 | Thomson | 212/242 |
| 4,784,420 A * | 11/1988 | Makino et al. | 294/81.4 |
| 6,439,407 B1 * | 8/2002 | Jacoff et al. | 212/274 |
| 2005/0042063 A1 * | 2/2005 | Ehrenleitner | 414/266 |

FOREIGN PATENT DOCUMENTS

| | | |
|---|---|---|
| DE | 2553221 | 11/1975 |
| DE | 4326946 | 9/1995 |

OTHER PUBLICATIONS

"F + H Fordern und Heben", 52 (Jul. 2002) No. 7, p. 461.

* cited by examiner

*Primary Examiner*—James W. Keenan
(74) *Attorney, Agent, or Firm*—Watson IP Group, PLC; Jovan N. Jovanovic; Vlaoan M. Vasiljevic

(57) ABSTRACT

A storage and retrieval unit comprises a supporting carriage which is movable along a rack aisle on at least one substantially horizontal supporting rail by a drive. A vertically adjustable lifting platform is suspended from the supporting carriage via at least three traction devices. In order to prevent the lifting platform from being laterally deflected or starting to oscillate during accelerations of the supporting carriage, a stabilizing device is provided. The latter comprises at least three traction devices fastened to the sides of the lifting platform which are opposite in the direction of travel. At least two traction devices run to at least two fastening points arranged in the region of one end of the aisle; at least one further traction device runs to a fastening point arranged in the region of the other end of the aisle. The effective length of each traction device between the lifting platform and the fastening point can be changed by a drive. The latter is controlled by a control system in such a way that all the traction devices are taut in each desired position of the lifting platform.

5 Claims, 2 Drawing Sheets

STORAGE AND RETRIEVAL UNIT

BACKGROUND OF THE INVENTION

1. Field of the Invention

The invention relates in general to storage and retrieval units, and more particularly, to a storage and retrieval unit having (a) a supporting carriage which is movable along a rack aisle on at least one substantially horizontal supporting rail by means of a drive; (b) a lifting platform carried along by the supporting carriage and intended for receiving storage items; (c) a lifting apparatus by means of which the lifting platform is movable in the vertical direction relative to the supporting carriage; (d) a stabilising device which prevents lateral deflection of the lifting platform relative to the supporting carriage.

2. Background Art

Storage and retrieval units of this type serve to store storage items in the compartments of high-bay racks and remove them from these again. The high-bay racks extend along a rack aisle in which the storage and retrieval unit is movable. To achieve a high turnover of the storage items and hence to minimise the overall size of the high-bay warehouse required for a given capacity, the speed with which the lifting platform can be moved from one position to the other should be as great as possible. Since the accelerated mass and the connecting device via which the lifting platform is connected to the supporting carriage form an oscillating system, a high acceleration usually also means the risk of large oscillations of the lifting platform.

Known storage and retrieval units of the type mentioned at the outset therefore have, besides the supporting carriage which is generally movable on the room floor, a massive column which is used to stabilise the lifting platform and on which the lifting platform is guided during its vertical movement. In order to achieve the necessary stiffness of the guide column, large masses are required. Storage and retrieval units of this type can reach a total weight of 25 metric tons. It is clear that enormous driving powers are required to be able to operate these storage and retrieval units with high accelerations. Despite the massive guide columns, considerable oscillation problems arise, especially as the natural frequencies of the oscillating system are relatively low on account of the high masses.

The object of the present invention is to design a storage and retrieval unit of the type mentioned at the outset in such a way that the lifting platform can be accelerated very rapidly and oscillation problems are minimised.

SUMMARY OF THE INVENTION

This object is achieved according to the invention in that the lifting apparatus comprises at least two traction means, on which the lifting platform is suspended from the supporting carriage. Furthermore, the stabilising device comprises: (a) at least three traction means fastened to sides of the lifting platform which are opposite in the direction of travel, at least two traction means running to at least two fastening points arranged in the region of one end of the aisle, and at least one traction means running to a fastening point arranged in the region of the other end of the aisle; (b) for each traction means a drive, through the actuation of which the effective length of the traction means between the lifting platform and the fastening point can be changed; (c) a control system which controls the drives in such a way that the traction means are taut in each desired position of the lifting platform.

The term "traction means" is understood to mean primarily ropes, chains, belts or the like. For terminological simplification these are referred to below as "ropes", which are representative of traction means of these types.

According to the invention, great care is taken to ensure that all the accelerated masses of the storage and retrieval unit, in particular the mass of the lifting apparatus and the mass of the stabilising device, are as small as possible. Small masses mean low forces and low driving powers which are required to accelerate the lifting platform. Through rapid movements of the lifting platform, the capacity of the high-bay warehouse can be increased or its dimensions can be reduced while the capacity is kept constant. Since the accelerated masses are at the same time masses of the oscillating system already mentioned above, the resonant frequencies are shifted to higher values, where they can be managed more easily. The lifting apparatus comprising at least three ropes which is used according to the invention has the smallest possible mass. The same applies to the stabilising device, which comprises only the at least three traction means. Furthermore, the traction means can be kept very taut, so that the spring constant of the spring of the oscillating system is very large and the frequency of the natural oscillations of this system is therefore also very high.

The storage and retrieval unit according to the invention is always mathematically precisely defined, and in particular has no ambiguous solutions to the kinematic equations, so that a computer-assisted control system is possible without any problems.

It is advantageous if the drives are arranged in pairs at opposite ends of the rack aisle and thus form the fastening points at these locations. In this case, the drives do not belong to the accelerated masses.

The design in which the drives are arranged on the lifting platform is less favourable in this regard but still has advantages over the prior art.

If flexible traction means are employed, suitable drives are in particular drums on which the traction means can be wound up.

It is expedient in this case if the drums arranged in each case on one side of the lifting platform are driven by a common drive shaft. With this design, use is made of the fact that the two traction means situated in each case on the same side of the lifting platform have to be lengthened or shortened in the same way during the movement of the lifting platform. Their drums therefore always have to be rotated in the same way. This can be achieved most simply by the common arrangement on the same drive shaft. As a result of this, the control complexity is also simplified.

BRIEF DESCRIPTION OF THE DRAWINGS

An exemplary embodiment of the invention is explained in more detail below with reference to the drawing, in which.

DETAILED DESCRIPTION OF THE DRAWINGS

Figure 1:
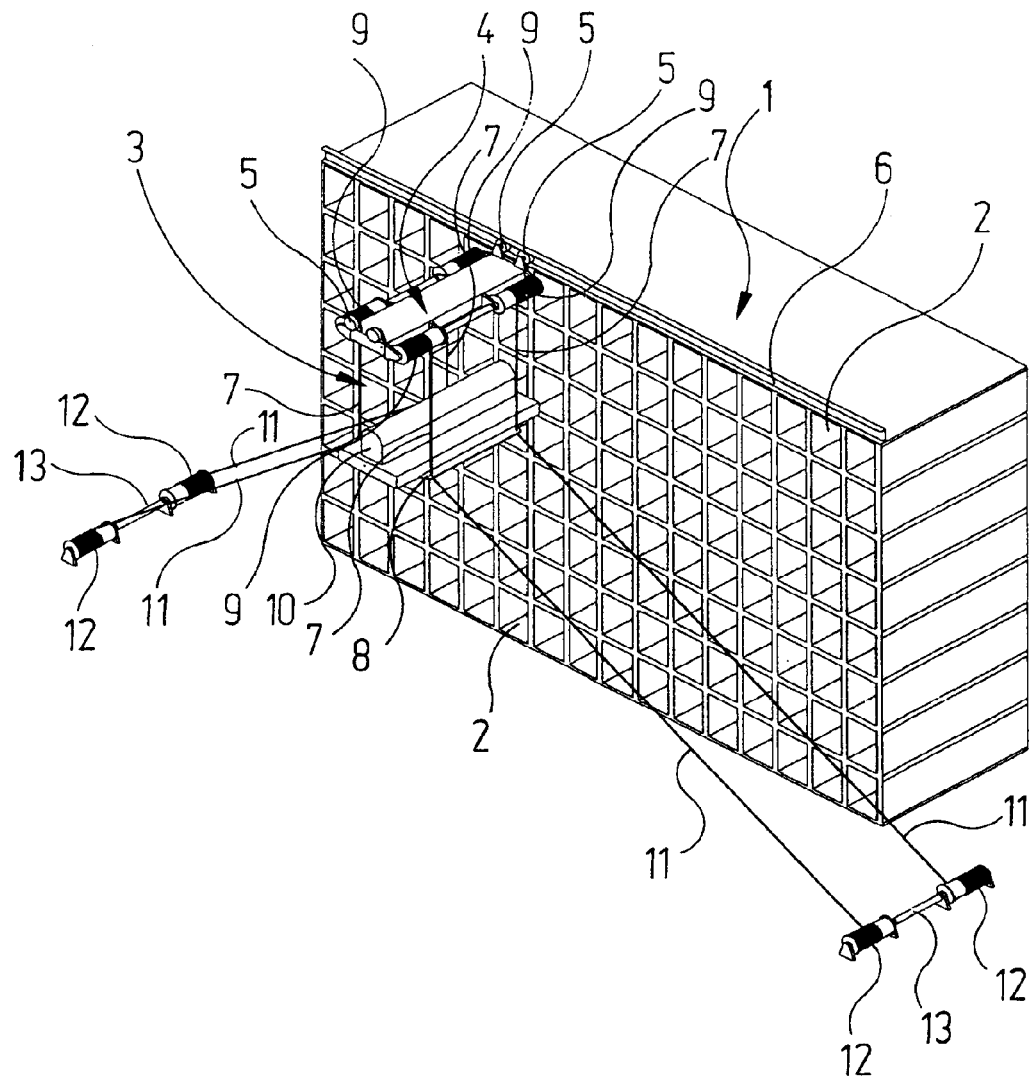
FIG. 1 shows, in perspective, a storage and retrieval unit according to the invention in front of a high-bay rack.
Figure 2:
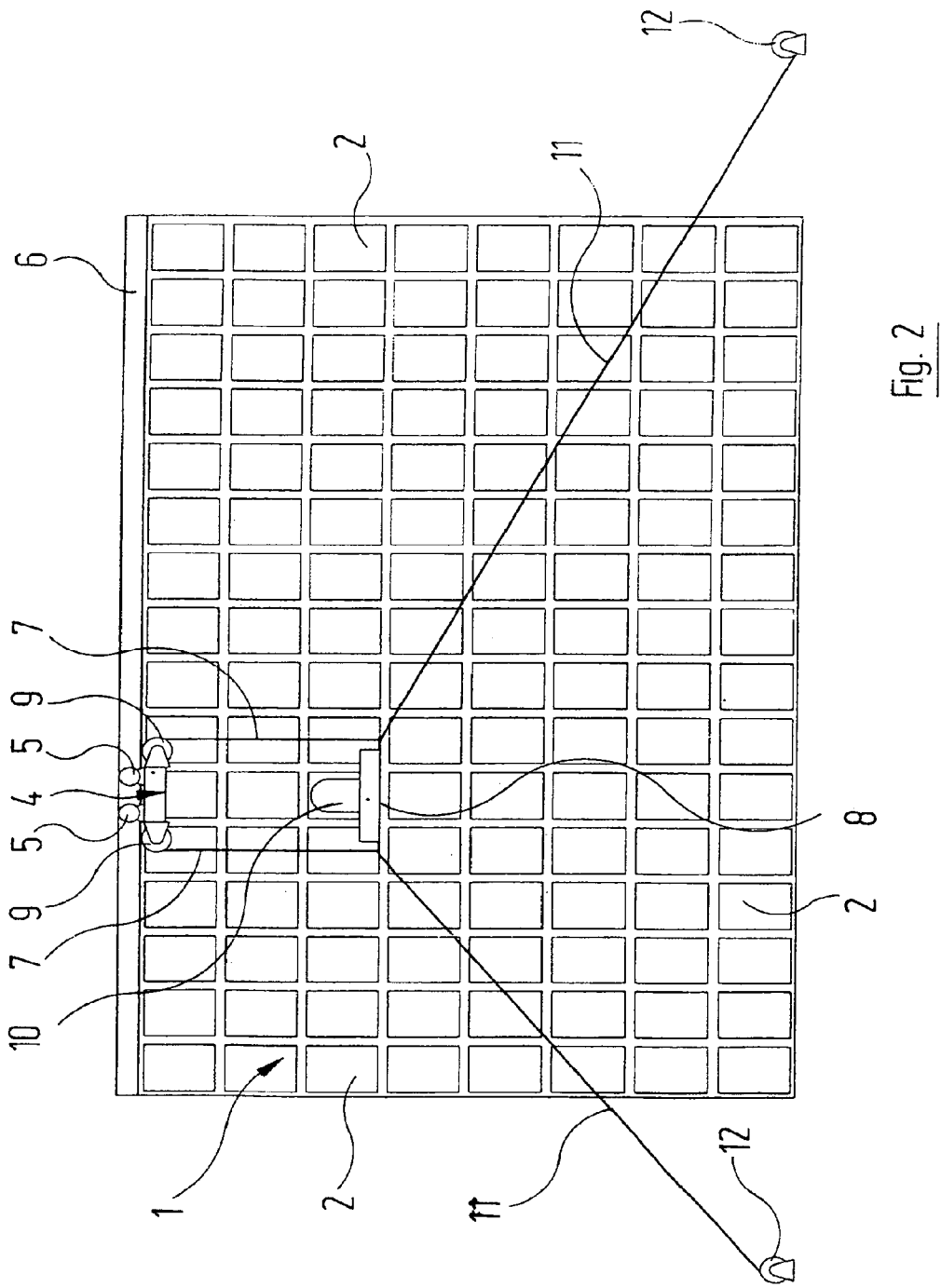
FIG. 2 shows the side view relating to FIG. 1.

While this invention is susceptible of embodiment in many different forms, there is shown in the drawings and described herein in detail a specific embodiment with the understanding that the present disclosure is to be considered as an exemplification of the principles of the invention and is not intended to limit the invention to the embodiment illustrated.

In the drawing, the reference numeral 1 denotes a conventional high-bay rack which comprises a steel structure and a multiplicity of rack compartments 2 in which storage items 10 can be stored. The storage of storage items 10 in the storage compartments 2 and/or the removal of storage items 10 from these storage compartments 2 is handled by a storage and retrieval unit 3 which is movable in a rack aisle between the high-bay rack 1 illustrated in FIG. 1 and a corresponding high-bay rack which can be imagined parallel to and in front of it.

The storage and retrieval unit 3 comprises a supporting carriage 4 which is provided on opposite sides with in each case one pair of driven supporting rollers 5. Each pair of supporting rollers 5 runs in a supporting rail 6 which is fastened to the upper edge of the corresponding high-bay rack 1 and runs substantially horizontally.

A lifting platform 8 is suspended from the supporting carriage 4 via four ropes 7. Driven rope drums 9 on the supporting carriage 4 receive the upper end region of the ropes 7, so that by winding up or unwinding the ropes 7 on or from the rope drums 9 the vertical position of the lifting platform 8 relative to the supporting carriage 4 can be changed.

The lifting platform 8 carries the storage items 10 and can, in accordance with the commands of a control system, be moved, by a horizontal translatory movement of the carriage 4 and a vertical movement relative to the supporting carriage 4, in front of each storage compartment 2, in order either to deposit the storage items 10 or pick them up at these locations.

The transporting of the storage items 10 to the destination positions should be done as quickly as possible. This means that the supporting carriage 4 with the lifting platform 8 carried along by it has to be accelerated to high speeds and decelerated again as quickly as possible. In order to prevent the lifting platform 8 from being laterally deflected, in particular from starting to oscillate, during these movement operations, a stabilising device comprising four tensioning ropes 11 is provided. Two of these tensioning ropes 11 are fastened to opposite sides of the lifting platform 8 in each case. Each tensioning rope 11 runs from the lifting platform 8 to a rope drum 12. The rope drums 12 are situated in pairs on the floor at the opposite ends of the rack aisle. The two rope drums 12 assigned to the same side of the lifting platform 8 are in each case, as illustrated in the drawing, connected to each other by a common drive shaft 13, so that they are always rotated together.

The horizontal position of the supporting carriage 4 and hence also of the lifting platform 8 carried along by it is monitored by a known position-measuring system. In a corresponding manner, the vertical position of the lifting platform 8 relative to the supporting carriage 4 is determined by a height-measuring system. The output signals of the position-measuring system and of the height-measuring system are supplied to a control system of the storage and retrieval unit 3.

The storage and retrieval unit 3 described operates in the following way:

First of all let us assume that, without changing the horizontal position of the supporting carriage 4 and the lifting platform 8, the latter is to be lowered further from the position illustrated in FIG. 1. In order to keep the tensioning ropes 11 taut during this vertical movement and thus prevent lateral deflection of the lifting platform 8, it is necessary to shorten the length of the tensioning ropes 11 between the lifting platform 8 and the corresponding rope drums 12. The required effective length of the tensioning ropes 11 can be calculated, based on the distance of the lifting platform 8 from the rope drums 12 and also from the vertical position of the lifting platform 8, using trigonometric functions. This calculation is performed by the control system, which gives the rope drums 12 corresponding commands to wind up the tensioning ropes 11.

If the lifting platform 8 is to be moved exclusively horizontally to the right from the position illustrated in FIG. 1, the drive of the supporting carriage 4 receives the corresponding commands. In order then to prevent lateral deflection of the lifting platform 8, the tensioning ropes 11 lying to the right of the lifting platform 8 in FIG. 1, i.e. in the direction of travel, have to be correspondingly shortened and the tensioning ropes 11 running to the left of the lifting platform 8 in FIG. 1, i.e. opposite the direction of travel, have to be correspondingly lengthened. Once again, the control system gives the different rope drums 12 the corresponding commands, which it again calculates, using trigonometric functions, from the vertical position of the lifting platform 8 and from the changing horizontal position of the supporting carriage 4.

A general movement of the lifting platform 8 in which the latter changes both its horizontal and vertical position is obtained by superimposing the above-described purely vertical movement and purely horizontal movement.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. Storage and retrieval unit comprising:
   a) a supporting carriage which is movable along a rack aisle on at least one substantially horizontal supporting rail by means of a lifting drive;
   b) a lifting platform carried along by the supporting carriage and intended for receiving at least one storage item, the lifting platform having a plurality of sides;
   c) a lifting apparatus by means of which the lifting platform is movable in the vertical direction relative to the supporting carriage, and which comprises at least two lifting traction means, on which the lifting platform is suspended from the supporting carriage; and
   d) a stabilising device which prevents lateral deflection of the lifting platform and comprises:
      da) at least three stabilisation traction means fastened to opposing sides of the lifting platform, at least two of the stabilisation traction means running to at least two fastening points arranged proximate one end of the rack aisle, and at least one of the stabilisation traction means running to a fastening point arranged proximate the other end of the rack aisle;
      db) for each of the stabilisation traction means a stabilisation drive, through the actuation of which the effective length of the stabilisation traction means between the lifting platform and the respective fastening point can be changed;
      dc) a control system which controls the drives in such a way that the stabilisation traction means are taut relative to the lifting platform upon positioning of the lifting platform in a desired position.

2. Storage and retrieval unit according to claim 1, wherein four stabilisation traction means are provided, with each having a stabilisation drive, the stabilisation drives are arranged in pairs at the opposite ends of the rack aisle and thus form the fastening points at these locations.

3. Storage and retrieval unit according to claim 1, wherein the stabilisation drives of the stabilisation traction means are one of arranged on the lifting platform and fixed relative to the rack aisle.

4. Storage and retrieval unit according to claim 1, wherein each of the stabilisation drives comprise drums onto which the stabilisation traction means can be wound up.

5. Storage and retrieval unit according to claim 4, wherein the drums of the stabilisation drives of the stabilisation traction means which are arranged on a same side of the lifting platform are driven by a common drive shaft.

* * * * *